United States Patent [19]

Lee et al.

[11] Patent Number: 4,641,099

[45] Date of Patent: Feb. 3, 1987

[54] METHODS FOR ENHANCING MAPPING OF THERMAL FRONTS IN OIL RECOVERY

[75] Inventors: David O. Lee; Paul C. Montoya; James R. Wayland, Jr., all of Albuquerque, N. Mex.

[73] Assignee: The United States of America as represented by the Department of Energy, Washington, D.C.

[21] Appl. No.: 595,011

[22] Filed: Mar. 30, 1984

[51] Int. Cl.⁴ .................... G01V 3/00; E21B 47/00
[52] U.S. Cl. ................................ 324/323; 166/251
[58] Field of Search ........... 324/323, 348, 349, 350; 166/251

[56] References Cited

U.S. PATENT DOCUMENTS

| | | | |
|---|---|---|---|
| 3,420,575 | 1/1969 | Hubner | 299/1 |
| 3,468,376 | 9/1969 | Slusser et al. | 166/272 |
| 3,483,730 | 12/1969 | Gilchrist et al. | 73/15 |
| 3,986,556 | 10/1976 | Haynes | 166/251 |
| 4,086,960 | 5/1978 | Haynes | 166/59 |
| 4,193,454 | 3/1980 | Goldstein | 166/302 |
| 4,210,867 | 7/1980 | Ginsburgh et al. | 324/323 |
| 4,210,868 | 7/1980 | Ginsburgh et al. | 324/323 |
| 4,249,602 | 2/1981 | Burton, III et al. | 166/251 |
| 4,266,608 | 5/1981 | McCollum | 166/250 |
| 4,271,904 | 6/1981 | Ginsburgh et al. | 166/251 |
| 4,315,656 | 2/1982 | Hall | 299/1 |

OTHER PUBLICATIONS

Wayland et al., "Sandia Heavy Oil Subprogram FY81 Annual Report", Mar. 1982.

Primary Examiner—Ernest F. Karlsen
Assistant Examiner—Walter E. Snow
Attorney, Agent, or Firm—George H. Libman; Albert Sopp; Judson R. Hightower

[57] ABSTRACT

A method for enhancing the resistivity contrasts of a thermal front in an oil recovery production field as measured by the CSAMT technique is disclosed. This method includes the steps of:

(a) preparing a CSAMT-determined topological resistivity map of the production field;

(b) introducing a solution of a dopant material into the production field at a concentration effective to alter the resistivity associated with the thermal front; said dopant material having a high cation exchange capacity which might be selected from the group consisting of montmorillonite, illite, and chlorite clays; said material being soluble in the connate water of the production field;

(c) preparing a CSAMT-determined topological resistivity map of the production field while said dopant material is moving therethrough; and (d) mathematically comparing the maps from step (a) and step (c) to determine the location of the thermal front.

This method is effective with the steam flood, fire flood and water flood techniques.

13 Claims, No Drawings

METHODS FOR ENHANCING MAPPING OF THERMAL FRONTS IN OIL RECOVERY

The U.S. Government has rights in this invention pursuant to Contract No. DE-AC04-76DP00789 between the U.S. Department of Energy and AT&T Technologies, Inc.

FIELD OF THE INVENTION

This invention relates to the mapping of thermal fronts associated with enhanced oil recovery operations by controlled source audio frequency magnetotelluric techniques, and to methods for enhancing the sensitivity of this technique.

BACKGROUND OF THE INVENTION

The mapping of thermal fronts associated with enhanced oil recovery (EOR) techniques from the surface has important application to improved reservoir stimulation. The present state of the art involves the drilling of monitor wells or the use of geophysical electromagnetic techniques. Monitor wells, however, can only provide local spot information, and the other techniques are not maximally effective nor sensitive.

U.S. Pat. No. 4,271,904 discloses a method of monitoring the progress and pattern of a combustion or flame front advancing through a combustible subterranean carbonaceous stratum, and for controlling the progress of the front. More particularly this patent teaches a method of monitoring the pattern and spatial orientation of a flame front during in situ retorting of oil shale, and injecting and controlling the flow of fuel or flue gases into the retort to control the speed, extent and uniformity of the flame front. The patented invention is based on a finding that rubblized shale makes a poor electrical coupling with the solid walls of the retort. However, as the shale burns, the flame front becomes a better electrical conductor. The front appears from the surface to be a plane of electrically conductive material embedded in the ground that changes position as the front moves. Resonance coil and resistance probe methods are suggested for electrical detection of the flame front.

The '904 patent also considers methods for controlling movement of the flame front. These involve the pumping of fuel and diluent gases through gas shafts into specified areas of the retort.

U.S. Pat. No. 3,986,556 to Haynes discloses the injection of a finely divided catalyst into a porous and permeable hydrocarbon bearing stratum in the earth. The catalyst promotes cracking of the heavy hydrocarbons within the reservoir, but there is no disclosure concerning monitoring the front as it progresses.

Controlled source audio frequency magnetotelluric surveys seek to map the shape and structure of objects below the surface of the earth from measurements made of the electromagnetic waves scattered by such an object. See generally, G. V. Keller and F. C. Triscknecht, *Electromagnetic Methods in Geophysical Prospecting* (New York: Pergamon Press, 1966), p 197; S. H. Ward *Theory*, Vol II of *Mining Geophysics* (The Society of Exploration Geophysicist, 1967), p 228; and W. M. Telford et al., *Applied Geophysics* (New York: Cambridge University Press), p 500.

For effective application of CSAMT surveying techniques to thermal front mapping, however, a substantial contrast in the resistivities of the surrounding media and the zone to be mapped must be present. Usually, this contrast must exceed that which is naturally inherent to the site to be surveyed.

SUMMARY OF THE INVENTION

In a method of use aspect, the present invention relates to a method for enhancing the resistivity contrasts of a thermal front produced by an enhanced oil recovery technique, to allow thermal front detection by a controlled source audio frequency magnetotelluric (CSAMT) technique. The method comprises the steps of: (a) removing core and conate water samples from the oil production recovery area; (b) selecting a dopant material having a high cation exchange capacity from the group consisting of montmorillonite, illite, and chlorite clays; said material being soluble in said conate water in sufficient concentration as to decrease the resistivity of the core sample by at least a factor of two while simultaneously remaining able to pass through said core without significantly plugging it as determined by a flowing permeability test; (c) preparing a CSAMT-determined topological resistivity map of the recovery area; (d) introducing a solution of said dopant material effective to alter the resistivity associated with the thermal front, which in the case of the steam flood technique is diluted from about 300:1 to 10:1 in water, into the injection well in a tertiary production field in an air/gas-to-water ratio by volume of about 1000 to 1; (e) preparing a CSAMT-determined topological resistivity map of the recovery area while said solution is flowing therethrough; and (f) mathematically comparing the maps from step (c) and step (e) to determine the location of the thermal front.

DETAILED DESCRIPTION OF THE PREFERRED EMBODIMENT

This invention is directed to a method for enhancing the resistivity contrast of thermal fronts for mapping with controlled source audio frequency magnetotelluric techniques. Generally, a material with a high cation exchange capacity (CEC) is injected into an injection well at the beginning or during the lifetime of a flooding process (fire flood, steam flood, water flood, etc.). This material produces a bank of ions that will be swept along, forming the leading edge of the flood. The existence of these ions in the front will make the front much more conductive than it would have been without these ions, i.e., this region of lowered resistivity will serve as a marker of the leading edge of the front. This marker would then enhance the detection capability of any instrument on the surface of the earth used to measure electromagnetic changes within an underground stratum. The enhancement allows better resolution of fronts at shallower depths and allows fronts at deeper depths to be mapped. Knowing the location of the fronts thus provides effective control of the flooding process.

In the CSAMT technique, the primary electromagnetic (EM) field is produced by a long dipole (e.g., 610 m, 2000 ft) laid out on the surface of the earth and grounded at both ends. A transmitter operating at selected frequencies (for example, at about 42–2048 Hz) is located at the center of the dipole. The transmitting antenna is located some distance (e.g., 305–1520 m, 1000–5000 ft) from the area to be interrogated. For example, the receiving antenna might consist of a relatively short dipole (e.g., 2–20 m, 6–66 ft) in contact with the earth at both ends to measure the electric field parallel to the transmitting antenna and a magnetometer to measure the magnetic field perpendicular to the transmitting antenna and in the plane of the earth. Measurements of the electric and magnetic fields are made at various frequencies and at selected locations over the area to be interrogated. More accurate measurements can be made if several orientations are available.

The critical factor in applying the CSAMT method is the change in electrical resistivity of the oil zone during a thermal EOR process. For a steam flood, the presence of the heated water, especially after contamination by formation material, will lower the resistivity of the oil zone. As the high-resistance oil is removed from the zone and replaced with the injected steam/hot water, the resistivity should decrease even further.

The inverse appears to be true for a fire-front EOR process. As the fire front moves through a region, some of the in-place oil is first vaporized, and lighter fractions are carried ahead of the front by the combustion gases and the unused injected air. Thus, in front of the fire zone, water from the combustion process and stripped ground water are moved into the formation. This may result in a lowered resistivity. Behind the fire zone, the oil and water saturation are almost zero. There, only the high-resistance rock remains. Just in front of the fire zone, coke is formed and then consumed. The resistivity of the fire front will be variable, depending upon the complex combustion chemistry.

Thus, the signature for a steam drive will be an apparent low resistivity that rather quickly returns, at the edge of the steam front, to the background resistivity or lower. For a fireflood, the signature will be a zone of high resistivity that changes in a short distance to an area of lower resistivity, with a return to the background resistivity moving away from the injection well.

The ability to track in situ enhanced oil recovery processes using EM techniques is not a new idea. Kraft made a detailed model study in which he set up a finite element model of the physical conditions that might be encountered, G. D. Kraft, "Two Dimensional Finite Element Electrical Resistivity Modeling of Axially Symmetric Structures," M. S. Dissertation, Penn. State Univ., November 1976. One of the problems he studied was a highly conductive layer of resistive overburden. He indicated that the changes in the apparent resistivity were large enough to be measurable. However, for the pancake disk conductive zone considered, the changes in the resistivity, $\rho_a$, did not correspond spatially with those of the disk. In this case, the conducting disk was at 600 meters (1,969 feet). Only when the conducting zone is much nearer to the surface would the changes in $\rho_a$ be expected to give a one-to-one mapping.

A detailed study by Goldstein and Strangway established limits for the most favorable application of the CSAMT mapping, M. A. Goldstein and D. W. Strangway, "Audio-Frequency Magnetotellurics with a Grounded Electric Dipole Source," Geophysics, Vol. 40 August 1975, pp 669-683. The resistivity $\rho_a$ in ohm-meters is related to two perpendicular components of the electric and magnetic field, e.g., $E_x$ and $H_y$, by $$\rho_a = \frac{1.26 \times 10^5}{f} \left| \frac{E_x}{H_y} \right|^2, \qquad (1)$$

where $E_x$ is in V/m, $H_y$ is measured in amp-turns/m, and f is the frequency in $H_z$. The skin depth, $\Delta$, the thickness of a homogeneous material of apparent resistivity $\rho_a$ required to attenuate the electromagnetic force (EMF) intensity by 1/e, is given by $$\delta \simeq 503 \sqrt{\rho_a/f}. \qquad (2)$$

The EMF from the transmitting dipole can be divided into a near field ($<3\delta$ from the dipole) and a far field ($>3\delta$) because the functional dependency of the electric and magnetic fields changes with distance from the source. Only when measurements are made in the far field will the apparent resistivities calculated using Eq. (1) correspond to the true resistivities associated with plane-wave solutions of EM field equations. However, the near-field measurements yield a more sensitive indication of changes in formation resistivities.

Prior work by the inventors and their coworkers at Sandia National Laboratories, Albuquerque, N. Mex., in this area has been reported in Sandia Reports SAND 81-2497, March, 1982 "Sandia Heavy Oil Subprogram FY81 Annual Report", SAND 82-1699, Nov. 1982, "Measurements for the BETC in Situ Combustion Experiment", SAND 83-0117, April, 1983, "Sandia Heavy Oil Subprogram FY82 Annual Report, and in SPE 1051, a paper entitled "Measurement of Formation Resistivity Changes Induced by In-Situ Combustion", the latter paper being presented at the 57th Annual Fall Technical Conference and Exhibition of the Society of Petroleum Engineers of AIME, New Orleans, LA, Sept. 26-29, 1982. These prior reports provide details of work in this field leading to development of the present invention and the disclosure of these prior reports are specifically incorporated into this disclosure by reference.

With the foregoing theory in mind, the following discussion presents a preferred method for practicing the subject matter of the present invention.

Initially, a core sample material is taken from the oil field in which the thermal front recovery process is being, or will be, practiced. The core material is removed by conventional methods, and is typically sampled from several locations within the recovery area, preferably prior to the primary oil production processes. Thus, reference core samples may be available at the time that the tertiary recovery methods are begun. The core sample material typically includes a sand or carbonate matrix, along with oil, conate water and other fines, including minute trace materials of various types. For purposes of the present invention, only about 1 to 1½ feet of core material are necessary along with approximately 1 liter or less of conate water. If core samples must be taken for the tertiary recovery methods described below, a conventional cutter is used that drills down through overlying formations, and is optimally extracted from one site near the middle of the recovery area. In oil fields known to have various core sample compositions, more than one core may preferably be prepared.

Next, a material having a high cation exchange capacity is selected that will flow through the core material without plugging. Generally preferred are clay materials such as montmorillonites, illites, and chlorites. These are conventional compounds known to have a high cation exchange capacity, and are composed of anhydrous aluminosilicates having a variable ionic content of heavy metals including iron and magnesium and other elements such as calcium and sodium. For the purposes of the present invention, other materials having a high cation exchange capacity may be equivalent, but generally speaking, the clay type materials mentioned above are adequate and preferred. Other cation exchange materials may be selected from the literature such as Lithology by Kern C. Jackson, published by McGraw-Hill, (1970), Table 3-1, page 100.

Because the chemistry of the core material is complex, a minimal amount of trial and error is necessary to select the appropriate cation exchange material that is optimally effective in a given core sample. However, the types of clay materials are generally found in several varieties, and are known in the art, and differ according to their source or origin. Using small aliquots of conate water, it is generally preferable to try five or six types of clays, most preferably of the montmorillonite type to determine the highest solubility of each type in a given sample of conate water. These cation exchange materials then are ranked in decreasing order of solubility.

Next, conventional flowing permeability tests are performed in a laboratory to determine which of the preferred, most soluble cation exchange materials flow through the core sample of about 1 to 1½ feet in length, preferably without causing plugging or gumming. These flow tests are commercially run by various laboratories. For example, Core Labs, is a testing company with offices in all major oil field areas and routinely performs such testing.

Initially, several samples of conate water with a saturated level of the selected cation exchange material are run through the core sample. The purpose of this testing is to avoid selecting a dopant cation exchange material that may significantly change the permeability of the rock in situ in the reservoir. If the selected cation exchange materials cause plugging of the test core sample in saturated solution, their concentrations are decreased gradually in order to determine the maximum concentration at which a given cation exchange material will flow without plugging when dissolved in the conate water.

Once acceptable concentrations of the preferred and ranked materials having high cation exchange capacity have been determined, the resistivity of the core sample is also measured in the laboratory while a given conate sample having one of the cation exchange materials is flowing through it.

The measured resistivity of the core material sample generally changes while the conate material with dopant is flowing through it, optimally a change by a factor of 5 is preferred; however, decreased resistivity by a factor of up to 1000 has been achieved in the laboratory. Impedance bridges such as the conventional four-point resistivity bridge may be utilized for purposes of laboratory resistivity measurements. The Hewlett-Packard Company makes such impedance bridges, and other sources for this equipment are known to workers in the field.

For use in the field, the selected cation exchange material is prepared by diluting the optimized concentration in conate water by a factor of from about 300:1 to 10:1, preferably from about 100:1 to 10:1. The dilutions are made in water. Although more concentrated solutions are effective in the methods of the present invention, saturated solutions and those of higher concentration are generally too expensive, and dilutions of about 100:1 work effectively in the field. Because the material having the high cation exchange capacity is introduced into the tertiary recovery area for a time period of ten days to about two weeks, an adequate reservoir of doped solution must be prepared and stored on site.

Once the dopant solution is selected and prepared, its use in the field varies somewhat depending on the type of tertiary recovery process involved. For example, if the steam flood technique is to be utilized, the dopant solution is injected in line with the steam to be introduced through the injection well. Generally, there is a steam generator in line at the top of the well which enters the injection well through a series of pipes and valves, etc., known as the "christmas tree". The dopant solution is injected into a selected valve, typically under pressure, so that it mixes with and is vaporized into the steam stream and carried down-hole into the formation. A continuous flow of steam and dopant solution is maintained while measurements are made over the approximately 10 day to two week period of the testing. Preferably, many tests would be made to detect the first pass of the thermal front once the cation exchange material has been introduced. However, this practice is not cost effective. In practice, while the dopant is being injected, many CSAMT measurements are made from the surface and the data analyzed, as discussed below. A map of the resistivities of various sites within the recovery area is also made, prior to introduction of the dopant, as a control.

Once the dopant is introduced into the injection well, the steam associated with this recovery technique interacts with the oil and other materials in the oilbearing underground formation. The oil and other hydrocarbons are volatilized and driven by the force of the steam away from the injection well. Several production wells, sometimes referred to as collection wells, are located in a particular pattern around the injection well. For example, the 5-spot pattern is commonly utilized in the field. Various types of injection production well systems are disclosed, for example, in U.S. Pat. Nos. 3,986,556 and 4,271,904. Thus, the steam introduced into the injection well forces its way through the underground formation toward the production well, and usually is injected at a constant rate. The steam condenses along the thermal front, which is the zone at which the steam condenses into water. This front moves at a slower rate away as the distance from the injection well increases. It is the location of this thermal front to which the methods of the present invention are directed.

At the thermal front, typically, the resistivity drops as the dopant solution moves past. As resistivity measurements are made by the CSAMT technique following the commencement of the introduction of materials having high cation exchange capacity, a topological map of the recovery area is made. These resistivity measurements are compared with those of the same sites prior to commencement of the test. The background, or control measurements, are divided into the new measurements; and where the resistivity drops (i.e., regions where the data ratio is less than one), this indicates the location of the thermal front. Where the ratio remains constant, this indicates that steam has not passed by that point.

The data is gathered during an approximately ten day to two week time period, which is required to map a large field. As noted above, doped solution is injected into the steam line for the entire testing duration. The map which is prepared may have up to about 300 to 400 positions and 2,000 to 3,000 data points are commonly gathered. As discussed above, the thermal front represents the point at which colder rock condenses the steam. This leading edge also indicates the point to which petroleum or conate water has been driven. Data analysis of the location of the thermal front provides useful data for several purposes. Primarily, it identifies the location of the thermal fronts to monitor production from the recovery area. Additionally, by determining the areas into which steam has flowed, it allows chemicals to be introduced into the steam flow in order to plug those parts of the reservoir where steam is undesirably flowing, i.e., by conventional blocking techniques. Additionally, it allows for the optimized placement of production wells in order to efficiently tap the petroleum volatilized and driven forward by the steam flood procedure.

The two general types of steam flood techniques—the steam flood which involves a continuous flow of steam, and the "huff and puff" which involves a two to three month steam treatment with interspersed three month soaking periods—are effectively monitored by the methods of the present invention. Additionally, water flood tertiary recovery procedures may also be utilized for purposes of the present invention, and for this procedure water containing the doping cation exchange materials are dissolved into the water introduced through the injection well. The various techniques of the fire flood procedure may also be utilized with the methods of the present invention. These include the dry-forward, wet-forward and reverse combustion procedures.

A typical dopant solution may include, for example about 5 to 100, preferably about 10 milligrams per liter, of the dopant in water. This solution would then be introduced such as in a stream flow, for example, in a gas/air-to-water ratio by volume of about 1000 to 1. This will decrease the resistivity at the thermal front by a substantial amount, perhaps by a factor of up to about 10,000. Model calculations indicate that this will then increase the existing sensitivity of CSAMT surveys of thermal fronts by a factor of up to about 100. In addition, because a series of measurements could be made before and also during the dopant-water injection, the exact location of the thermal front can be found by simple subtraction or renormalization techniques. Thus, locating the thermal front is greatly facilitated by the methods of the present invention.

CSAMT equipment necessary for monitoring is commercially available and well known in the art. There are several CSAMT equipment packs available on the market, some being microprocessor controlled and facilitate the data collection component of the procedure. Field grade equipment is also available, as are basic components of the CSAMT system which are commercially available from the Zonge ENG. Co., for example.

The following example is presented to illustrate the invention and is not considered to be limiting thereon. Parts are by weight unless unless otherwise indicated.

EXAMPLE

In this experiment, the resistivity of the formation was measured as a fire front passed through in a dry forward burn as described for example in Sandia Report No. 82-874, J. R. Wayland, D. O. Lee, P. C. Montoya, "Measurement of Resistivity Changes Induced by In Situ Combustion". There was a two decade increase as the firefront moved past the measuring electrodes. Water was then injected which contained 10 milligrams per liter of montmorillonite clay with an air-to-water ratio by volume of 100 to 1. The resistivity of the firefront decreased by a factor of $10^4$. Thus the improvements of the inventive method are apparent.

From the foregoing description and discussion, one skilled in the art can easily ascertain the central characteristics of this invention. For the purposes of the methods of the invention, the exact composition of the cation exchange material is not critical, as long as the material has a high exchange capacity and flows effectively through core material samples, thereby increasing the laboratory measurements of resistivity in the sample. Accordingly, and without departing from the spirit and scope of the invention discussed above, various changes and modifications of the methods of the present invention may be made to adapt them to various particular usages and conditions. Thus, the the foregoing discussion of the preferred specific embodiments are, therefore, to be construed as merely illustrative and not limitative of the disclosure in any way whatsoever.

What is claimed is:

1. A method for enhancing the resistivity contrasts of a thermal front produced by enhanced oil recovery techniques in a production field, to allow its detection by a controlled source audio frequency magnetotelluric (CSAMT) technique, comprising the steps of:
    (a) preparing a CSAMT-determined topological resistivity map of the production field;
    (b) injecting a solution of a dopant material into the production field at a concentration effective to alter the resistivity associated with the thermal front; said dopant material having a high cation exchange capacity and being soluble in the conate water of the production field;
    (c) preparing a CSAMT-determined topological resistivity map of the production field while said dopant material is moving therethrough; and
    (d) mathematically comparing the maps from step (a) and step (c) to determine the location of the thermal front.

2. The method of claim 1, wherein the steam flood technique is utilized to produce the thermal front.

3. The method of claim 1, wherein the fire flood technique is utilized to produce the thermal front.

4. The method of claim 1, wherein the water flood technique is utilized to produce the thermal front.

5. A method according to claim 1 wherein the dopant is a clay.

6. A method according to claim 5 wherein the dopant material is selected from the group consisting of montmorillonite, illite and chlorite clays.

7. A method for enhancing the resistivity contrasts of a thermal front produced by enhanced oil recovery techniques in a production field, to allow its detection by a controlled source audio frequency magnetotelluric (CSAMT) technique, comprising the steps of:
    (a) removing core and conate water samples from the recovery area;
    (b) selecting a dopant material having a high cation exchange capacity, which is soluble in said conate water in sufficient concentration as to increase the resistivity of the core sample by at least a factor of two while simultaneously remaining able to pass through said core without significantly plugging it as determined by a flowing permeability test;
    (c) preparing a CSAMT-determined topological resistivity map of the production field;

(d) injecting a solution of said dopant material into the production field at a concentration effective to alter the resistivity associated with the thermal front;

(e) preparing a CSAMT-determined topological resistivity map of the production field while said dopant material is moving therethrough; and (f) mathematically comparing the maps from step (c) and step (e) to determine the location of the thermal front.

8. A method according to claim 7 wherein the dopant is a clay material.

9. A method according to claim 8 wherein the clay material is selected from the group consisting of montmorillonite, illite and chlorite clays.

10. The method of claim 7, wherein the steam flood technique is utilized to produce the thermal front.

11. The method of claim 8, wherein said dopant material is diluted from about 300:1 to 10:1 in water and introduced into an injection well in the production field in an air/gas-to-water ratio by volume of about 1000:1.

12. The method of claim 7, wherein the fire flood technique is utilized to produce the thermal front.

13. The method of claim 7, wherein the water flood technique is utilized to produce the thermal front.

* * * * *